Nov. 13, 1962 G. J. PARKS 3,063,215
APPARATUS FOR THERMALLY SEALING PACKAGED COMMODITIES
Filed Aug. 28, 1959 3 Sheets-Sheet 1
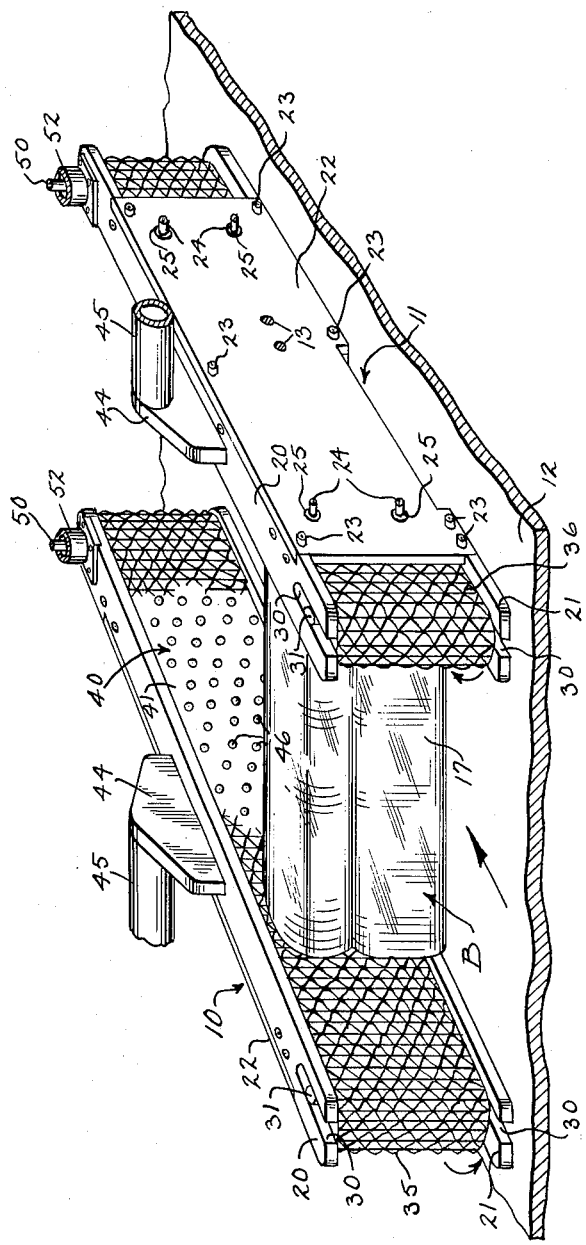
INVENTOR
GEORGE J. PARKS
BY
*Arnold J. Ericson*
ATTORNEY

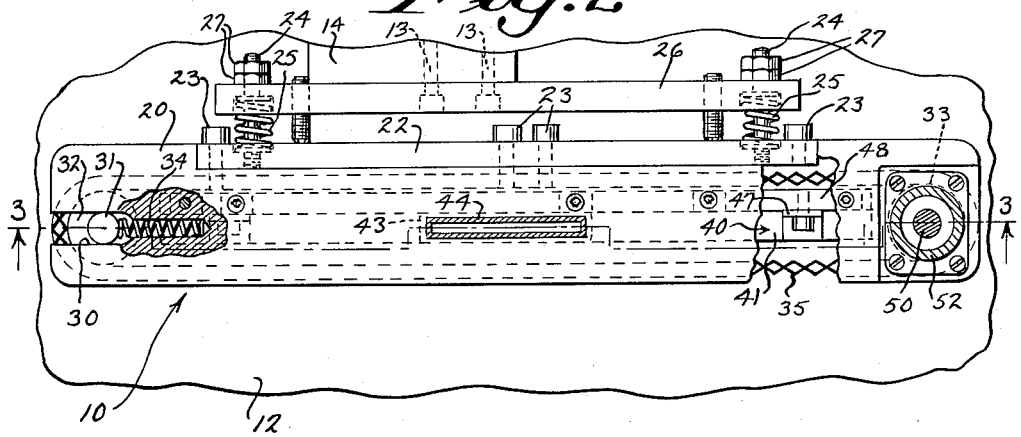
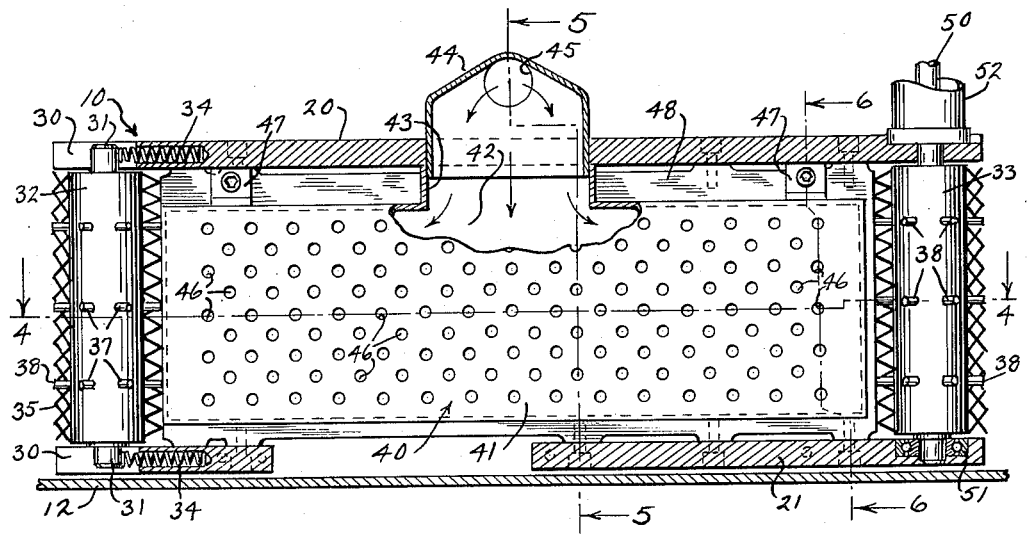

Nov. 13, 1962 G. J. PARKS 3,063,215
APPARATUS FOR THERMALLY SEALING PACKAGED COMMODITIES
Filed Aug. 28, 1959 3 Sheets-Sheet 3
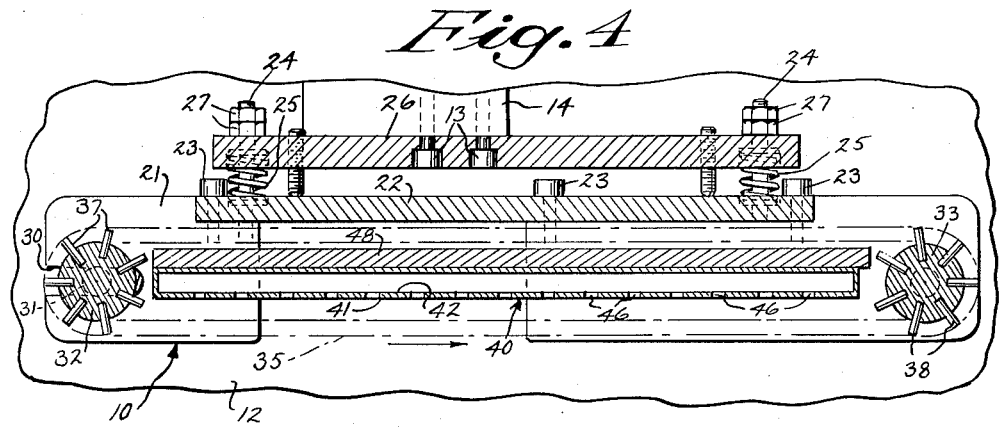
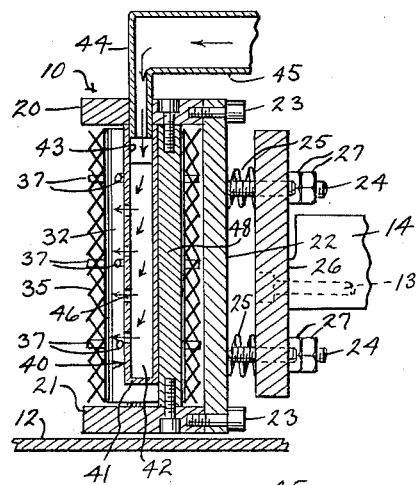
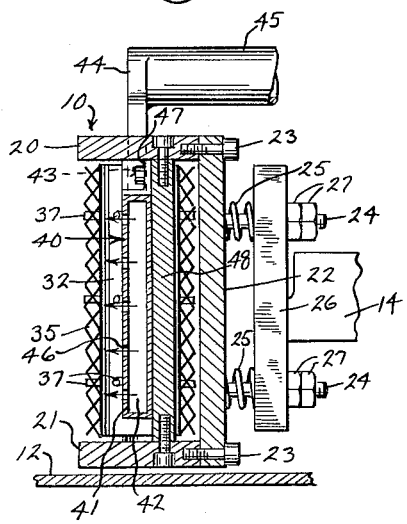
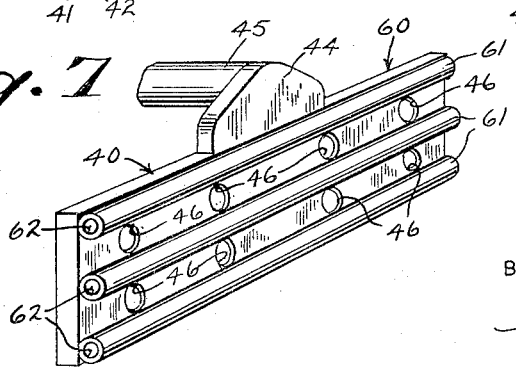
INVENTOR
GEORGE J. PARKS
BY
ATTORNEY United States Patent Office 3,063,215
Patented Nov. 13, 1962

3,063,215
APPARATUS FOR THERMALLY SEALING
PACKAGED COMMODITIES
George J. Parks, Menomonee Falls, Wis., assignor to Milprint, Inc., Milwaukee, Wis., a corporation of Delaware
Filed Aug. 28, 1959, Ser. No. 836,638
2 Claims. (Cl. 53—388)

The present invention relates to an improved heat-sealing apparatus and method of thermally sealing packaged commodities, and more specifically is directed to an apparatus comprising means for applying sealing pressure to the sealable surface of the packaged commodity which pressure means is of a construction and material permitting heat to be readily dissipated therefrom, and wherein heat is concurrently applied to the sealable surface from a source independent of said pressure means, such as by means of a heated fluid, such as air, under forced draft and directed towards the surface to be sealed.

Conventional sealing devices used in thermally sealing the folds or lapped over layers of packaging materials, such as those used in providing wrappers for bread or other commodities, generally employ a heated member or members of such shape that they will provide the required type of seal and which are adapted to be in direct pressure contact throughout their entire surface with the sealable exposed wrapper surface. In order to provide an adequate seal, these devices require the following conditions:

(1) Adjustable temperature control.
(2) Adjustable pressure control.
(3) Adjustable dwell (timing cycle of seal).

A change in any one of the above control factors will require a change in one or both of the remaining two factors. These factors are dependent upon one another inasmuch as the thermosealing is a function of all three, with each being directly related to the others. The proper relationship of the three control factors is critical in obtaining the satisfactory heat seal. Very often a tight seal is provided, but in the case of delicate materials, such as thin layers of polyethylene, burn spots often occur in a single layer in the immediate proximity of folded double or triple sealed layers. A further disadvantage to conventional heat sealing equipment lies in the fact that it usually requires an additional medium, such as a layer of Teflon (polytetrafluorethylene), a silicone release spray or some other means of covering or coating the heating surface in direct contact with the wrapper. This is necessary to prevent sticking or blocking of the wrapper to the heated surface or surfaces.

The above factors and disadvantages are especially noticeable in the case of heat sealing wrappers of polyethylene film which provides a relatively wide softening range and is subject to rupture under pressurized heating conditions.

In recent years the use of polyethylene films has exhibited a marked increase especially as a wrapper material for use in packaging commodities, such as bread or other items. In the case of bread wrappers, it is often desirable to provide a wrapper wherein at least a portion is transparent as by means of a panel of cellophane, or regenerated cellulose. The regenerated cellulose film is clear and highly transparent, but has the disadvantages of being relatively expensive, and has a hard texture and cold feel or touch quality. This film is also subject to deterioration under certain conditions, and does not itself possess the best possible protective qualities. It has been found from an economic standpoint and from the standpoint of transparency and attractiveness, and mainly from the view of providing a good moisture proof barrier, to be quite desirable to provide plastic wrapper films of polyethylene or polypropylene in the field of commodity packaging.

It is therefore an object of the present invention to provide an improved heat sealing apparatus and method of heat sealing wrapping materials for packaged commodities, wherein certain disadvantages of conventional devices may be eliminated.

It is another object of the present invention to provide a heat sealing apparatus for previously enwrapped commodities wherein the surface to be firmly sealed is exposed for an interval of time to the direct application of a heated fluid, such as air, under forced draft conditions, and in which the folded or overlapped areas to be sealed are maintained in sealing position by means independent of the source of heating fluid, and wherein the means for maintaining the folds permit heat to radiate or otherwise be disseminated from the areas of contact.

It is a further object of this invention to provide an improved sealing means for thermally sealing an enwrapped commodity, which means comprises a source of heated air, or other fluid, under forced draft, and heat dissipating spacer means arranged for direct contact with the commodity and being further arranged to space the commodity from the source of heat while maintaining the areas to be sealed in sealable relationship.

It is still another object of this invention to provide in one embodiment thereof an apparatus for thermally sealing an enwrapped commodity which apparatus comprises laterally spaced, tensioned, endless belts of open mesh material arranged to clamping engage opposite sealable end portions of a commodity disposed therebetween, and to move the commodity, while maintaining clamping pressure upon the sealable portions, transversely through a zone of heated air or other fluid under forced draft and directed towards the areas to be thermally sealed, whereby heat and pressure may be controlled independently of one another.

In its preferred embodiment the present invention provides laterally spaced, endless, open mesh belts of steel woven material, the belts serving the dual purpose of applying pressure to the package as well as conveying the package. The open mesh belt remains relatively cool (below the softening point of the wrapping material), and therefore, pressure, which is always a control factor in heat sealing, is now made independent of the other control factors. This difference provides several distinct advantages over previous heat sealing apparatus. These are listed as follows:

(1) Minimum warm up time and minimum time required to reduce heat. This is possible by keeping the mass of the mesh belt to a minimum so that relatively little of the heat in the heated forced air is lost to the metallic belt. Thus, an even operating temperature of the woven mesh belt can be maintained at practically the ambient temperature. The heated air is responsible for making the seal, and the woven mesh belt serves only to hold the wrapping material under the proper pressure to permit the heat to effect surface-to-surface seals.

(2) The temperature of the woven wire mesh belt remains relatively cool which, in turn, eliminates the need for Teflon coatings or silicon release sprays, as there will be no tendency for the wrapping material to stick to the belt.

(3) Pinhole burn-throughs in areas of lighter folds (such as at end wrapped areas of packages) are eliminated, as the forced hot air tends to blow the light fold areas away from the heat source. The tensioned belts provide contact with the multiple folded areas which are to be sealed. The resultant heat differential is considerably reduced to thereby eliminate the common pinhole burns.

(4) Excessive heat in the body frame of the sealing apparatus is reduced, which is an advantage as bearings and other moving parts can be operated trouble-free with longer sustained life.

(5) Heat adjustment in the system of the present invention is less critical than in conventional systems. It is possible to operate over a wider temperature range with consistently satisfactory results than was possible with conventional directly heated sealing apparatus.

(6) The forced heated air or other fluid system of sealing, unlike conventional methods of sealing, does not require adjustment of heat setting when changing from standby to operation. This is possible since the heat source is continually providing a fixed volume of heated air, which is either dissipated to atmosphere (when not coming into contact with an object to be sealed), or utilized when the object to be sealed is in position transversely of the directed stream of hot air.

(7) Diversion of hot air may be easily incorporated into the apparatus. Thus should the machine be stopped for adjustments with a package left in the sealing zone, the forced heated air may be diverted away from the sealing zone, using any conventional by-pass damper arrangement in the hot air intake pipe. The hot-air sealing system does not require storage of heat to remain operative; therefore, operation may be resumed immediately after the hot air flow is again directed to the sealing mechanism.

(8) The forced hot air system assists in laying wrapping material folds together for achieving maximum contact of material layers (during application of heat to effect the seal). The over all effect of this advantage improves tight seals on irregular shaped objects such as bread. It is impossible to obtain full heat contact of such irregular shaped objects on conventional flat heated surfaces, as direct contact heating elements can only heat seal surfaces in intimate contact therewith.

These and other objects and advantages will become apparent upon consideration of the description to follow, taken in connection with the drawings in which:

FIG. 1 is a perspective view of the sealing elements of an apparatus in accordance with one embodiment of the present invention suitable for sealing opposed ends of an enwrapped commodity such as bread;

FIG. 2 is a top plan view, partly broken away and partly in section illustrating one side unit of the heat sealing apparatus disclosed in FIG. 1.

FIG. 3 is a vertical sectional view, partially broken away of the apparatus, taken along line 3—3 of FIG. 2, and more particularly illustrating the heat sealing elements;

FIG. 4 is a cross sectional view taken along lines 4—4 of FIG. 3;

FIG. 5 is a vertical sectional view taken in the plane of lines 5—5 indicated in FIG. 3;

FIG. 6 is a vertical sectional view taken in the plane of lines 6—6 of FIG. 3; and FIG. 7 is a perspective view of a heat sealing element in accordance with another embodiment of the present invention.

Referring to the embodiment of FIGS. 1-6, the heat sealing apparatus of the present invention is readily adapted as an attachment to conventional bread wrapping machinery, and may be readily substituted for the end sealing plate apparatus of conventional machinery. The apparatus of the present embodiment comprises a pair of laterally spaced, substantially identical, heat sealing units, indicated generally by the reference numerals 10 and 11, supported from a side frame casting (not shown) of a conventional commercial wrapping machine by means of countersunk cap screws 13 engaging tapped openings in the end of a laterally, inwardly extending support member 14.

The arrangement for providing the bottom seal for loaves of bread is conventional and is not considered to be a part of the present invention.

As stated previously, both of the units 10 and 11 are substantially identical and further description will be directed to the exemplary unit 10. Each unit respectively comprises vertically spaced longitudinal frame members 20 and 21 secured to the supporting back plate 22 by such means as removable Allen-head screws 23 threadingly engaging tapped openings in each of the members 20 and 21. As shown in FIGS. 2, 4, 5, and 6, the back plate 22 may be mounted for inward lateral bias by means of threaded studs 24 engaging tapped openings in the plate 22 and including a coil compression spring 25 tending to force the back plate 22 inwardly of the stationary support 26. The studs 24 are slidably received in openings of the stationary plate 26 and are adjustably secured to the plate by means of the double nuts 27 threaded thereon.

The frame members 20 and 21 are each provided with open-ended slots 30 arranged to slidably receive oppositely extending axles 31 protruding from a cylindrical idler pulley 32 rotable therein. The idler pulley 32 is laterally spaced from a drive pulley 33, and is preferably biased outwardly of the open ended slots 30 of the members 20 and 21 by means of compression springs 34 at either end thereof and seated in re-entrant bores of each frame member. This serves to automatically tension endless belts 35 and 36 of the respective units 10 and 11 which are rotably supported at opposite ends by the pulleys 32 and 33. The belts 35 and 36 are preferably of woven mesh construction and are provided with further support by means of the axially and circumferentially spaced pegs 37 and 38 extending radially from the pulleys 32 and 33, respectively. The pegs also prevent slippage of the woven mesh belt on the drive pulley.

It is preferable to provide heated air under forced draft conditions as a means of sealing thermoplastic surfaces of the wrapper, but it is within the province of the present invention to provide such sealing by means of other heated gases, if so desired and where direct contact with air might deleteriously affect the sealing characteristics. In the present embodiment, heated air is supplied to a manifold 40 comprising a housing 41 enclosed on all sides to provide a hollow chamber 42 (see FIG. 3) except for a necked opening 43 slidably communicating with a heat duct 44. The heat duct 44, in turn, communicates through a laterally extending pipe 45 to a source (not shown) of heated air or other suitable gas. The heated air source includes means for providing the air under forced draft and preferably also includes conventional valving, such as butterfly valves or dampers (not shown) for controlling or directing flow. The housing 41 includes a plurality of openings 46 distributed substantially throughout its inwardly disposed side of its longitudinal surface facing the transversely moving enwrapped commodity. It will be noted that the manifold 40 is preferably disposed between the elongated surfaces of the belt 36 intermediate the pulleys 32 and 33 for placement in near proximity to the surface to be sealed. It is conceivable, however, that the heating manifold 40 might be disposed at the outer side of the open mesh belt and remain within the province of the present invention, although it is obvious that the additional interference of one more belt layer may interfere with some seals. In order to reduce the frictional components of heated gas to be distributed to the wrapper surface, it is desirable to calculate the total area of the various holes or openings 46 to be approximately equivalent to the area of the intake pipe 45.

Thus, as indicated in FIGS. 3, 5 and 6, the hollow manifold 40 may be suspended by means of spaced brackets 47 engaging an upright plate 48. The plate 48 thus further serves to provide an intermediate support for the frame members 20 and 21. It is to be noted that the front surface of the manifold 40 should be smooth to permit non-interfering, slidable engagement with the respective moving steel belts 35 and 36.

The drive pulley 33 is connected at one end, as indicated at FIG. 3 to a drive shaft 50 and is rotatably supported at its opposite end by the bearing 51. The shaft 50 is suitably positioned in a protective housing or shroud 52, and is driven by means of a motor (not shown) and suitable speed reduction means (not shown), if so desired.

It will now become apparent that the present heat sealing apparatus may be readily substituted for conventional commodity wrapper sealing devices and has special application for use in bread wrapping, and particular application wherein the bread wrapping material is of relatively delicate nature, such as polyethylene film. The sealing units 10 and 11 are spaced apart, and may be made laterally adjustable (not shown) to be of suitable dimension to accommodate uniform size commodity packages therebetween. The relatively fine adjustment is automatically applied by pressure of the springs 31 against the axles of the pulley 32 to tension the moving belts 35 and 36 for reaction force against the commodity ends, such as the bread loaf B. It will be apparent that the belts which are preferably constructed of woven mesh, and in particular, may be of woven steel wire mesh, are inherently resilient, and when stretched, will present opposing forces in directions toward maintaining pressure contact upon the ends of the commodity package for purposes of moving the package in a transverse direction. Where desired, the apparatus may be positioned at other angles than the upright position shown in the drawings (not shown) for effective operation.

The loaves B, in the case of packaged bread, are previously wrapped under well known practices and are fed to the continuously moving belts 35 and 36 in wrapped condition with the usual bottom overlap (not shown) and end folds at opposite sides (not shown). The belts are arranged to clampingly engage the intermediately disposed loaves and act to retain the end folds of the loaf in sealing relationship. The bottom overlapped portion is maintained in place by the bed plate 12 as the loaf moves along. As the bread is moved transversely relative to the units 10 and 11, it will pass into the heat zone defined by the openings 46 of the manifold 40. Direct contact of forced heated air from the manifold openings 46 acts to soften the sealing lacquer or other thermoplastic surface of the wrapper to provide a means of sealing the folded layers to one another. The bottom seal may be provided by means well known to the art, as by conventional bed plate sealers of commercial wrapping machines. It is conceivable, however, that the bottom seal may be applied by subjecting the bottom surface portion to direct contact with forced heated air from a manifold (not shown) communicating therewith below a suitable opening in the base portion (not shown). Upon leaving the heat zone the softened adhering layers will be cooled to complete the seal. Although it has not thus far been found to be necessary, it is conceivable that certain seals may require additional cooling. This obviously may be supplied from auxiliary supply manifolds (not shown) similar to manifold 40, but connected to a source of cool air or other gas.

The embodiment of FIG. 7 illustrates another form of the present invention wherein like reference numerals indicate like parts of the previously described embodiment. In the present embodiment the continuously moving endless belts are not used in the manner previously described, but the enwrapped commodities are either placed individually between heating units 60 which may be reciprocally actuated towards and away from one another in relatively opposed directions, the opposite unit not being shown herein, or the commodities may be carried transversely relative thereto by means of a continuously moving conveyor belt (not shown) positioned therebelow. The unit 60 comprises a manifold 40 arranged to be supplied with heated air, or other gas, under pressure from the intake pipe 45 communicating with the duct 44. Openings 46 are provided, as in the first embodiment, for directing the stream of air to the commodity. Spaced apart pressure members 61 may be attached directly to the manifold 40 and extend longitudinally therewith for direct pressure contact with the commodity wrapper. In order to provide an additional means for dissipating heat the pressure members may be made tubular to provide respective bores 62, therein, and arranged for conducting a coolant therethrough. Thus, it will be apparent that two units 60 may be arranged for movement towards one another for reciprocating motion to intermittently engage a commodity passing therebetween. The essentials of the present invention are again present in providing a means for direct heat sealing by means of a heated air or other gas, and a means for dissipating this heat from members in direct pressure contact with surfaces to be sealed by the heated air.

It will be apparent that a single manifold 40 may be provided where only one surface is to be sealed. However, the present arrangement provides simultaneous automatic sealing of opposite ends of a package incident to good sealing practice for commodities such as bread.

I claim:

1. Apparatus for thermally sealing contacting sealable wrapper portions of a previously enwrapped commodity; said apparatus including a pair of opposed flexible endless belts spring biased toward each other, at least one of said belts being fabricated of open mesh material, and said pair of opposed flexible endless belts being arranged to receive and transport the commodity; spaced apart pulley members revolubly supporting said belts, at least one of said pulleys having peg-like projections extending radially therefrom to engage said open mesh material of said belts for the lateral support and prevention of slippage of said belts with respect to said pulleys; mounting means for said pulleys adapted to allow radial adjustment of said pulleys and having springs biasing said pulleys away from each other to maintain constant tension in said belts; pulley drive means; and fluid conduit means located between the layers of said endless belt fabricated of open mesh material to define a heating zone intermediate the ends of said belt, and comprising a relatively flat manifold member connected to a source of heated fluid and having a plurality of exhaust openings at one side thereof to direct said heated fluid through the open mesh of said innermost belt layers towards the sealable wrapper portions of said enwrapped commodity.

2. Apparatus for thermally sealing contacting sealable wrapper portions of a previously enwrapped commodity; said apparatus including a fluid conduit means comprising a relatively flat manifold member connected to a source of heated fluid and having a plurality of exhaust openings to direct said fluid through said exhaust openings towards the sealable wrapper portions of said enwrapped commodity; tube means fastened to the face of said manifold member adjacent said exhaust openings and adapted to receive a coolant circulating therethrough to provide a cooling surface for contact with the wrapper of said enwrapped commodity.

References Cited in the file of this patent

UNITED STATES PATENTS

| | | |
|---|---|---|
| 2,037,903 | Hilburt | Apr. 21, 1936 |
| 2,097,515 | Chambless | Nov. 2, 1937 |
| 2,114,833 | Fincke | Apr. 19, 1938 |
| 2,155,614 | Petskeyes et al. | Apr. 25, 1939 |
| 2,423,237 | Haslacher | July 1, 1947 |
| 2,727,345 | Schoppee | Dec. 20, 1955 |
| 2,890,555 | Hayssen | June 16, 1959 |
| 2,904,943 | Dreyfus et al. | Sept. 22, 1959 |

FOREIGN PATENTS

| | | |
|---|---|---|
| 469,696 | Great Britain | July 30, 1937 |
| 114,269 | Australia | Dec. 4, 1941 |

UNITED STATES PATENT OFFICE
CERTIFICATE OF CORRECTION

Patent No. 3,063,215                      November 13, 1962

George J. Parks

It is hereby certified that error appears in the above numbered patent requiring correction and that the said Letters Patent should read as corrected below.

Column 2, line 31, for "clamping" read -- clampingly --; column 6, line 58, for "cooling" read -- cool --.

Signed and sealed this 9th day of July 1963.

(SEAL)
Attest:

ERNEST W. SWIDER
Attesting Officer

DAVID L. LADD
Commissioner of Patents